(12) United States Patent
Seubert

(10) Patent No.: US 6,411,481 B1
(45) Date of Patent: Jun. 25, 2002

(54) METHOD AND DEVICE FOR SUPPRESSING OVER-VOLTAGES

(75) Inventor: Bernhard Seubert, Kuelsheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/445,493
(22) PCT Filed: Mar. 18, 1999
(86) PCT No.: PCT/DE99/00749
   § 371 (c)(1),
   (2), (4) Date: Dec. 8, 1999
(87) PCT Pub. No.: WO99/53591
   PCT Pub. Date: Oct. 21, 1999

(30) Foreign Application Priority Data

Apr. 9, 1998 (DE) .......................................... 198 15 983

(51) Int. Cl.⁷ ................................................. H02H 9/00
(52) U.S. Cl. ...................... 361/91.1; 361/91.5; 361/111
(58) Field of Search ................................ 361/91.1, 91.3, 361/91.5, 56, 111, 18, 60, 75; 307/10.1, 139, 141, 113, 115

(56) References Cited

U.S. PATENT DOCUMENTS 4,703,388 A  * 10/1987 Ruhnau ...................... 361/91.1
4,835,416 A  *  5/1989 Miller ........................ 361/91.1
5,130,883 A  *  7/1992 Edwards ..................... 361/91.1

FOREIGN PATENT DOCUMENTS

DE    44 32 520    2/1996
DE    44 33 045    3/1996
EP    0 179 194    4/1986

* cited by examiner

Primary Examiner—Stephen W. Jackson
(74) Attorney, Agent, or Firm—Kenyon & Kenyon

(57) ABSTRACT

A method and a device for reducing overvoltages is described. A switch and a load are connected in series between a first and a second terminal of a voltage source. The switch is triggered in such a way that the current flow through the load is released if the voltage exceeds a threshold value.

8 Claims, 3 Drawing Sheets

METHOD AND DEVICE FOR SUPPRESSING OVER-VOLTAGES

FIELD OF THE INVENTION

The present invention relates to a method and a device for reducing overvoltages.

BACKGROUND INFORMATION

A method and a device for reducing overvoltages are described in German Patent Application No. 44 33 045. In that publication a suppressor diode is used. Suppressor diodes of that type or similar suppressor components are generally very expensive.

SUMMARY OF THE INVENTION

The object of the present invention is, in a method and a device for reducing overvoltages, to dispense with expensive suppressor diodes or suppressor components.

In the case of the device and the method according to the present invention, one can dispense with expensive suppressor components, as elements that are already present are used.

DETAILED DESCRIPTION

Figure 1:
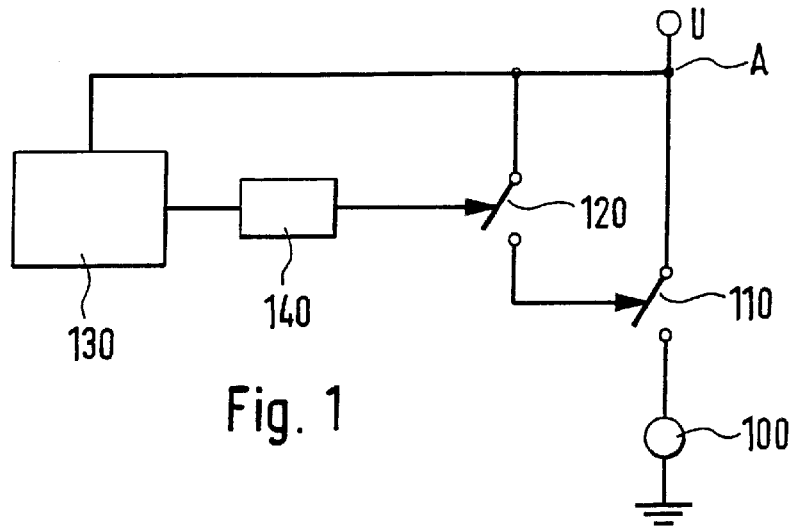
FIG. 1 shows a basic circuit diagram of a device according to the present invention.

FIG. 1 shows a rough schematic diagram of the device according to the present invention. 100 is a load which is connected to a connection point A and a voltage U via a first switch means 110. The second terminal of load 100 is connected to ground. Voltage U can be applied to load 100 by triggering first switch means 110. Load 100 is preferably an inductive or a capacitive load, for example an electric motor or an electromagnetic valve. Electric motors of this kind are used, for example, in motor vehicles, to drive pumps-for conveying hydraulic fluids in brake systems. Inductive and capacitive loads are particularly suitable, because if a voltage is applied for a short time it does not immediately cause the load to respond.

A trigger signal is applied to first switch means 110 by a second switch means 120. To accomplish this, the control input of first switch means 110 can be connected to voltage U via second switch means 120. In addition, voltage U is supplied to a monitoring unit 130, which applies a trigger signal to second switch means 120 via a delay element 140.

In motor vehicles, which are a preferable application for this circuit, overvoltages occur frequently. This means that voltage U at point A assumes a value well above the usual value of, for example, 12 volts. Overvoltages of this kind are usually termed load dump impulses. These overvoltages can destroy components, particularly electronic components.

According to the present invention, a load dump impulse of this kind is sensed by monitoring unit 130, which evaluates voltage U at point A. Voltage U is referred to below as "the voltage to be monitored." Above a limit voltage, for example 30 volts, load 100 is actuated via first switch means 110. Current flow through the load is released if voltage U present at the voltage source exceeds a threshold value.

The load dump impulse is reduced by actively closing the first switch means. The energy of the load dump impulse is thus largely absorbed by the load. The trigger signal for actuating the first switch means is canceled again after a wait time. The current flow through the load is eliminated after a wait time has elapsed.

Load 100 is preferably a pump, in particular a recirculating pump of an ABS, acceleration skid control and/or dynamic handling control system. This pump conveys hydraulic fluid in the hydraulic circuit of a system that influences the braking action of a motor vehicle. It is particularly advantageous if this hydraulic fluid is conveyed into a reservoir or a store tank.

There are particular advantages to using a recirculating pump as the load for reducing the load dump impulse, as the recirculating pump is not damaged by the short-term overvoltage. As a general rule, the load dump impulse does not cause the pump to start up and convey hydraulic fluid. Alternatively, instead of a recirculating pump one can use other loads that are not damaged by a short-term higher voltage in the form of the supply voltage and/or do not respond when a short-term voltage of this kind is applied, i.e., the pump does not start up or the electromagnetic valve is not actuated.

Figure 2:
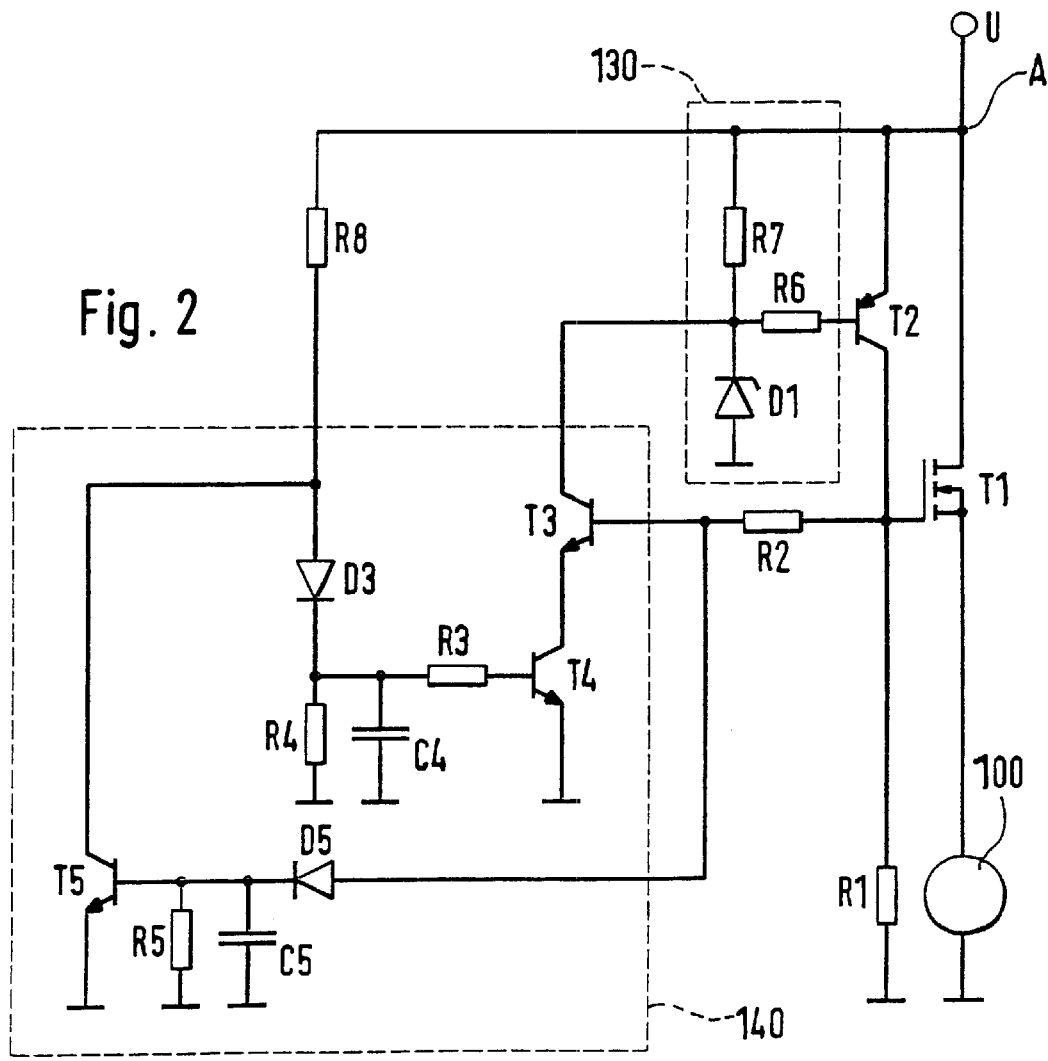
FIG. 2 shows a detailed diagram of a device according to the present invention.

FIG. 2 shows the monitoring unit and the delay element in greater detail. We have used the same reference characters for elements already shown in FIG. 1. In FIG. 2, switch means 110 is shown as transistor T1. Transistor T1 is preferably a field-effect transistor. The gate of transistor T1 is connected to ground via a first resistor R1 and to point A via the emitter-collector region of a PNP transistor T2. Transistor T2 corresponds to second switch means 120 in FIG. 1.

The base of second transistor T2 is also connected to point A via resistors R6 and R7, which are connected in series. The connection point between resistor R6 and resistor R7 is connected to ground via a diode D1. Diode D1 is preferably a Zener diode, the anode of the diode being connected to ground.

In the exemplary embodiment shown, the Zener voltage of Zener-diode D1 is equal to the limit voltage at which voltage is applied to the recirculating pump.

In addition, the connection point between resistor R6 and resistor R7 is connected to ground via transistors T3 and T4, which are connected in series. The base of transistor T3 is connected to the gate terminal of transistor T1 via a resistor R2. The base of transistor T4 is connected to point A via an RC network that includes resistors R3 and R4 and capacitor E4, and via a diode D3 and a resistor R8.

Herein, the base is connected directly to point A via resistor R3, diode D3 and resistor R8. The connection point between diode D3 and resistor R3 is connected to ground via capacitor C4 and resistor R4, which are connected in parallel. The cathode of diode D3 is connected to resistors R4 and R3.

The connection point between resistor R8 and diode D3 is connected to ground via a transistor T5. The base of transistor T5 is also connected to ground via a resistor R5 and a capacitor C5, which are connected in parallel.

In addition, the base of transistor T5 is connected to the base of transistor T3 via a diode D5. Herein, the anode of diode D5 is connected to the base of transistor T3.

Transistors T3, T4 and T5 are preferably NPN transistors. If other transistors and switch means are used, they are connected accordingly.

If an overvoltage occurs at point A, transistor T2 and thus transistor T1 are actuated via transistor T3. The energy of the load dump impulse is absorbed by the switching of the load 100. Thus the overvoltage of the impulse is not merely limited but rather is completely eliminated, because of the excitation of load 100.

After a delay, switch T1 is opened by transistors T4 and T5 having the corresponding RC elements that functioned as the delay element.

The circuit can also partially or completely be designed as an integrated circuit. In this case, the function of elements 140, 130 and transistor T2 are handled by the integrated circuit. A first time element ensures that the current flow through the load is eliminated after a first wait time has elapsed. In the embodiment shown in FIG. 2, the RC element that includes resistor R3 and capacitor C4 constitutes the first time element. The first wait time and the first time element are designed so that the trigger is so short that the load does not respond. A second time element ensures that the first wait time only begins to elapse after a second wait time has elapsed. In the embodiment shown in FIG. 2, the RC element that includes resistor R5 and capacitor C5 constitutes the second time element. In particular, the time elements can be logic devices. Preferably all elements except load 100 and switch means T1 are integrated into one component.

Figure 3A:
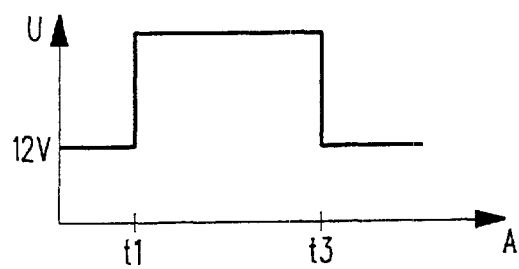
FIG. 3a shows a first voltage plotted over time.
Figure 3B:
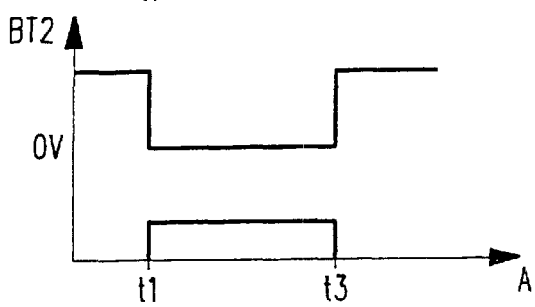
FIG. 3b shows a second voltage plotted over time.
Figure 3C:
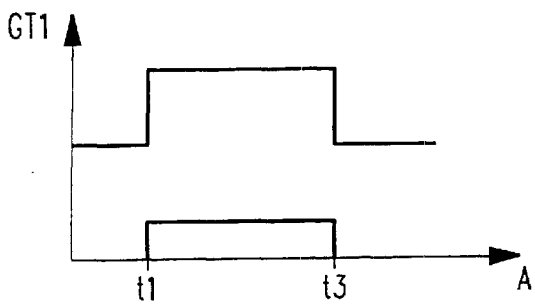
FIG. 3c shows a third voltage plotted over time.
Figure 3D:
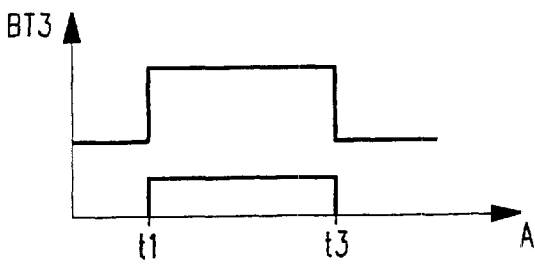
FIG. 3d shows a fourth voltage plotted over time.
Figure 3E:
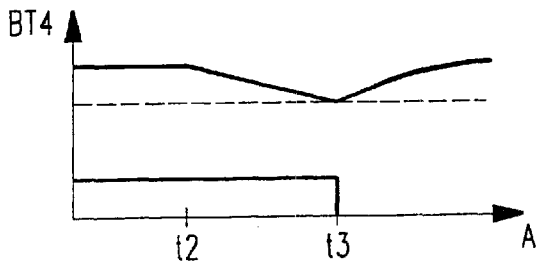
FIG. 3e shows a fifth voltage plotted over time.
Figure 3F:
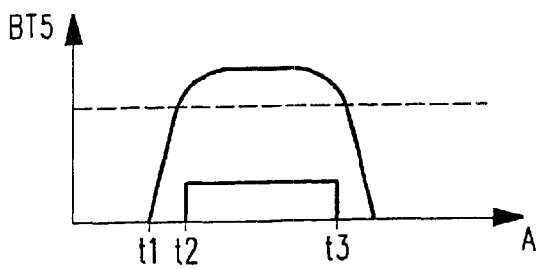
FIG. 3f shows a sixth voltage plotted over time.

The functionality of the circuit shown in FIG. 2 is explained in greater detail with reference to FIG. 3. Voltage U at point A is shown in Sub-FIG. 3a. Sub-FIG. 3b shows voltage BT2 at the base of transistor T2 and the circuit state of transistor T2. Sub-FIG. 3c shows voltage GT1 at the gate of transistor T1 and the circuit state of transistor T1. Sub-FIGS. 3d, 3e and 3f show voltages BT3, BT4 and BT5 at the base of transistors T3, T4 and T5 respectively and the circuit states of transistors T3, T4 and T5.

In the normal state, a voltage of about 12 volts is present at point A. This means the base terminal of transistor T2 is also at a voltage of 12 volts. This means transistor T2 is in its non-conducting state. If transistor T2 is in its non-conducting state, a voltage of 0 volts is present at the gate terminal of transistor T1. The result of this is that transistor T1 is in its non-conducting state. A voltage of 0 volts is also present at the base of transistor T3. This means that transistor T3 is also in its non-conducting state. Capacitor C4 is charged via voltage dividers R8 and R4, and voltage BT4 at the base of transistor T4 assumes a value which is significantly greater than 0. As a result, transistor T4 becomes conductive. Capacitor C5 is discharged and thus a voltage BT5, which assumes the value 0, is present at the base of transistor T5, and transistor T5 therefore does not conduct.

At time t1, the voltage at point A increases to a value which is well above 30 volts. If the voltage at point A exceeds the Zener voltage of diode D1, the voltage at the base of the emitter region of transistor T2 falls to values greater than 0 volts, and transistor T2, which is preferably a PNP transistor, becomes conductive.

As a result, transistor T2 connects the gate terminal of transistor T1 with point A; therefore the gate terminal of transistor T1 is at a high potential, and transistor T1 therefore conducts. As a result, current flows through load 100. At the same time, the potential at the base of transistor T3 increases, which causes transistor T3 to become conductive also. Thus from time t1 on, transistor T3 and transistor T4 are both conductive.

As a result, the base terminal of transistor T2 is at ground potential for a prolonged period and transistor T2 remains conductive. From time t1 on, capacitor C5 is charged via resistor R2 and diode D5. This means the voltage at the base of transistor T5 gradually increases. The base of transistor T4 remains at its existing potential.

At time t2, the voltage at capacitor C5 reaches the value at which transistor T5 becomes conductive. As a result, from time t2 on, the connection point between diode D3 and resistor R8 is at ground potential. As a result, capacitor C4 is discharged via resistor R4. This means voltage BT4 at the base of transistor T4 drops.

At time t3, the voltage at the base of transistor T4 has dropped so far that transistor T4 becomes non-conductive. As a result, ground potential is no longer present at the base of transistor T2. If the overvoltage has been eliminated, transistor T2 remains in its non-conductive state and in terms of transistors T1, T2, T3 the initial state is recreated. Capacitor C4 is recharged to battery voltage via diode D3 and resistor R8 and the voltage at the base of transistor T5 and at capacitor C5 drops to zero.

The overvoltage is sensed via Zener diode D1 and results in actuation of transistor T2, which in turn triggers switch T1. Thus, means are provided that trigger switch means T1 in such a way that the current flow through load 100 is released if the voltage exceeds a threshold value. These means include at least a second switch means T2, which assumes a second state if the voltage exceeds the threshold value. Herein, second switch means T2 triggers first switch means T1 in such a way that it becomes conductive. Transistor T2 is kept conductive by transistors T3 and T4, which are connected in series. Thus a locking means is provided which triggers the second switch means in such a way that it remains in its second state. Herein, transistor T3 remains conductive until transistor T2 once again becomes non-conductive. Transistor T4 remains conductive until the voltage at the RC element that includes capacitor C4 and resistor R4 drops below a threshold value. Thus one can ensure that triggering of transistors T2 and T1 is canceled after a wait time has elapsed. The wait time is specified by the RC element that includes capacitor C4 and resistor R4.

Discharging of the RC element that includes capacitor C4 and resistor R4, and thus the first wait time, only begins after a second wait time has elapsed. This second wait time is implemented by the RC element that includes capacitor C5 and resistor R5. At the same time that transistors T1 and T2 are triggered, the RC element that includes capacitor C5 and resistor R5 is initialized. If the voltage at capacitor C5 reaches a specified value, transistor T5 becomes conductive and therefore initializes the RC element that includes capacitor C4 and resistor R4. Thus at least one time element is provided which, after a wait time has elapsed, triggers the second switch means in such a way that it assumes its first state.

The current flow through the load is released when an overvoltage is detected, i.e., the voltage exceeds a threshold value. Herein, the circuit is designed so that the current flow is sustained until a wait time has elapsed. This wait time is specified by at least one RC element.

The voltage to be monitored is preferably supply voltage U of a control device and/or the voltage at the input of a control device.

The RC elements are dimensioned so that the wait time is chosen so that the load does not respond. This means that in cases where a pump is used, the pump does not start up, or only does so for a short time. In cases where an electromagnetic valve is used, the electromagnetic valve does not change its state. The wait time is chosen to be long enough to ensure the load dump is reduced safely. Hence when switch means T1 is opened the voltage no longer rises to increased values.

Figure 4:
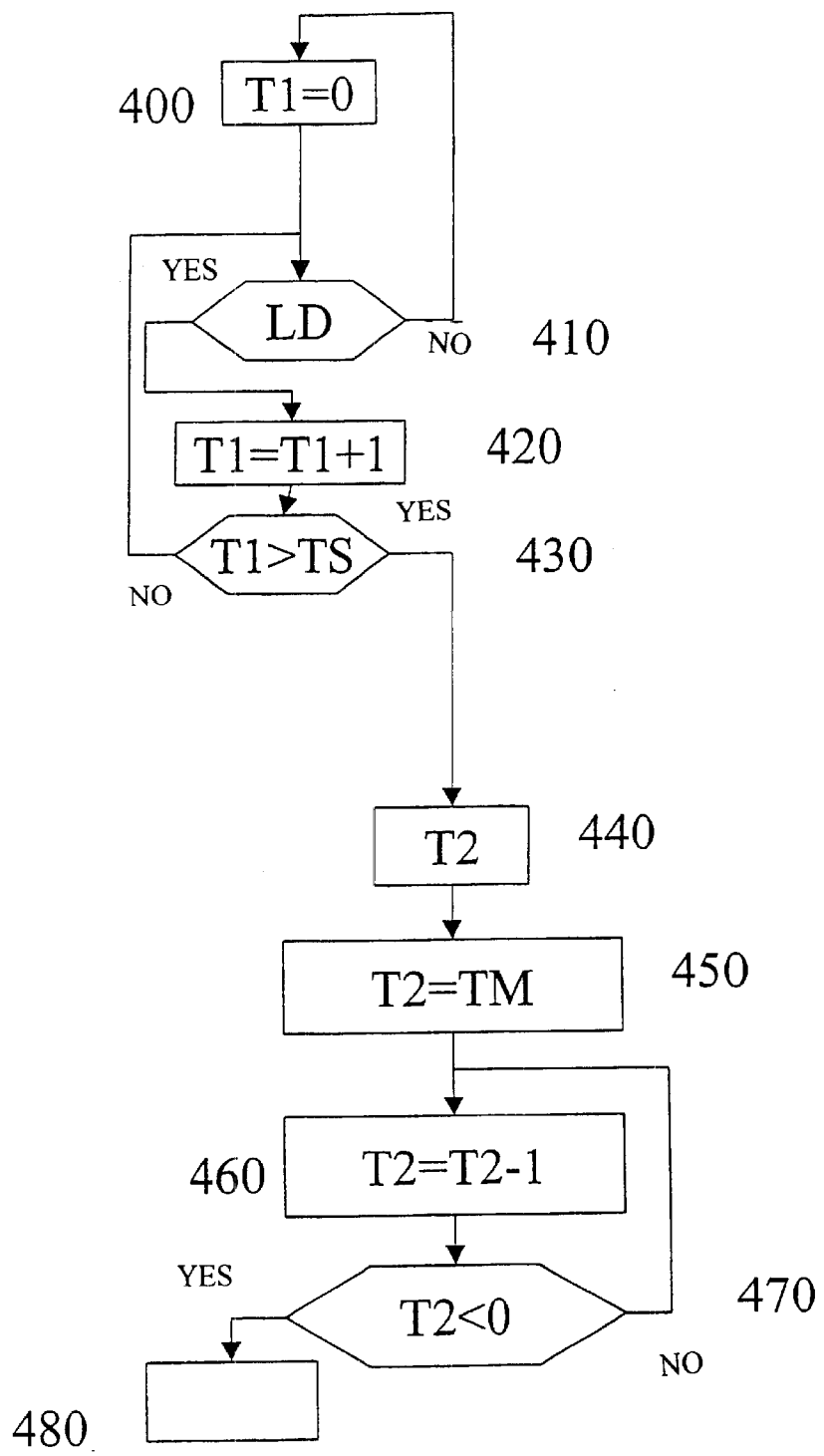
FIG. 4 shows a flow diagram illustrating a method in accordance with the present invention.

A further embodiment of the present invention is shown as a flow chart in FIG. 4. In a first step 400 second time counter T1 is set to zero. Subsequent query 410 checks whether a load dump is present. Preferably, query 410 checks whether the voltage to be monitored is greater than a threshold value. If this is not the case, step 400 is repeated.

If query 410 determines that the voltage to be monitored is greater than the preassigned threshold value LD, the second time counter is increased in step 420. Subsequent query 430 checks whether time counter T1 has exceeded a threshold value TS. If this is not the case, query 410 is repeated. If query 430 determines that time counter T1 is greater than threshold value TS, step 440 is carried out. Below, we also refer to threshold value TS as the "second wait time."

As a result of query 430 and the second time counter, a load dump is not detected until the voltage to be monitored is greater than threshold value LD for longer than second wait time TS. This ensures the load dump function is not triggered by short-term disruptive impulses.

In step 440, the current flow through the load is Initialized. Next, in step 450, a first time counter T2 is set to a preassigned value TM. Next, in step 460, the time counter is incremented. Subsequent query 470 checks whether first time counter T2 is less than zero. If this is not the case, step 460 is repeated. If the first time counter has been incremented to 0, the current flow through the load is eliminated in step 480.

As a result of query 470 and the first time counter, when a load dump is detected the load is supplied with current for a preassigned first wait time TM, to ensure the overvoltage is eliminated safely.

The load dump is only detected if the voltage is greater than a threshold value for a specified second wait time T1. If a load dump is detected, the load is triggered for first wait time T2 regardless of the value assumed by the voltage to be monitored.

As a result of this method, multiple switching in and out of the load dump function can be avoided.

It is particularly advantageous if time counters T1 and T2 are designed as RC elements. Herein, it is particularly advantageous that only one capacitor is used for both RC elements. If one adopts this approach in the case of the example shown in FIG. 2, one leaves out elements T5, R5 and C5. In the case of a load dump, capacitor C4 of the first time element is charged via the voltage to be monitored and resistor R8 and diode D3. Second wait time TS is specified via the values of the RC element that includes resistor R8 and capacitor C4.

First wait time TM, during which the load is supplied with current, is specified by capacitor C4 and resistor R4. The load is supplied with current until the capacitor has discharged via resistor R4.

Preferably, the queries and monitoring of the voltage are implemented via an integrated component or a logic device. The capacitor of the time elements is preferably arranged outside the component.

What is claimed is:

1. A method for reducing overvoltages in an arrangement including a first switch and a load connected in series between a first terminal and a second terminal of a voltage source, comprising the steps of:

triggering the first switch so that a current flow through the load is released if a voltage present at the voltage source exceeds a threshold value; and eliminating the current flow through the load after a first wait time has elapsed;

wherein a duration of the first wait time is selected so that the load is unresponsive.

2. The method according to claim 1, wherein the first wait time does not begin to elapse until a second wait time has elapsed.

3. A device for reducing overvoltages, comprising:

a first switch;

a load connected in series with the first switch between a first terminal and a second terminal of a voltage source;

a triggering device, the triggering device triggering the first switch so that a current flow through the load is released if a voltage present at the voltage source exceeds a threshold value; and a first time element, the first time element eliminating the current flow through the load after a first wait time has elapsed;

wherein a duration of the first wait time is selected so that the load is unresponsive.

4. The device according to claim 3, further comprising:

a second time element, the second time element starting the first wait time after a second wait time has elapsed.

5. The device according to claim 3, wherein the load includes a pump.

6. The device according to claim 3, wherein the pump includes a hydraulic pump of a system that influences a braking action of a motor vehicle.

7. The device according to claim 3, wherein the triggering device includes at least a second switch, the second switch assuming a second state if the voltage exceeds the threshold value and triggering the first switch to assume a conductive state.

8. The device according to claim 6, further comprising:

a locking device, the locking device triggering the second switch so that the second switch remains in the second state.

* * * * *